(12) United States Patent
Masunaga

(10) Patent No.: US 6,793,338 B2
(45) Date of Patent: Sep. 21, 2004

(54) RIMLESS SPECTACLES WITH LENS HOLDING STABILITY

(75) Inventor: Satoru Masunaga, Fukui (JP)

(73) Assignee: Masunaga Optical Mfg., Co., Ltd., Fukui (JP)

( * ) Notice: Subject to any disclaimer, the term of this patent is extended or adjusted under 35 U.S.C. 154(b) by 302 days.

(21) Appl. No.: 10/129,662

(22) PCT Filed: Nov. 16, 2001

(86) PCT No.: PCT/JP01/10030
§ 371 (c)(1),
(2), (4) Date: May 9, 2002

(87) PCT Pub. No.: WO03/014804
PCT Pub. Date: Feb. 20, 2003

(65) Prior Publication Data
US 2003/0025871 A1 Feb. 6, 2003

(30) Foreign Application Priority Data
Aug. 3, 2001 (JP) .......................................... 2001-236214

(51) Int. Cl.[7] .................................................. G02C 1/02
(52) U.S. Cl. ......................... 351/110; 351/141; 351/143
(58) Field of Search ................................ 351/110, 141, 351/142, 143, 148, 150, 153

(56) References Cited

U.S. PATENT DOCUMENTS

| 5,771,086 A | 6/1998 | Horikawa |
| 5,835,183 A | 11/1998 | Murai et al. |
| 6,210,002 B1 * | 4/2001 | Tachibana .................... 351/110 |
| 6,315,409 B1 * | 11/2001 | Watanabe ..................... 351/141 |
| 6,439,717 B2 * | 8/2002 | Weber .......................... 351/110 |

FOREIGN PATENT DOCUMENTS

| EP | 0 718 660 A1 | 6/1996 |
| EP | 0 724 178 A1 | 7/1996 |
| WO | WO 00/26716 | 5/2000 |

* cited by examiner

Primary Examiner—Huy Mai
(74) Attorney, Agent, or Firm—Snider & Associates; Ronald R. Snider

(57) ABSTRACT

The present invention relates to the rimless spectacles with lens holding stability, the jointing condition between the respective lenses and the parts to be engaged thereto of which spectacles is very stable and which shape stability lasts for a long period of time. Such rimless spectacles is provided as not only being stable in the jointing condition between the respective lenses and the parts to be engaged thereto so as to keep its shape intact for a long period of time and simplifying the number of the assembly parts so as to be advantageous for the parts inventory control as well as the maintenance thereof, but also improving the production efficiency thereof. The rimless spectacles according to the present invention is characterized in providing the respective ends of the bridge with a splint plate to abut onto the inner fringe side of the respective lenses and a pin to poke through said respective lenses for connection and providing the respective endpieces with a splint plate to abut onto the outer fringe side of the respective lenses and a pin to poke through said respective lenses for connection while driving a pressure exerting screw through the respective splint plates so as to hold the end portion of said screw in check against the fringe side of the respective lenses.

52 Claims, 3 Drawing Sheets

RIMLESS SPECTACLES WITH LENS HOLDING STABILITY

TECHNICAL FIELD

This invention relates to an improvement on rimless spectacles, in more details, pertaining to the rimless spectacles with lens holding stability whose lenses are very stably jointed to its engagement parts without the displacement thereof during use and whose stability in shape lasts for a long period of time.

BACKGROUND ART

Because the rimless spectacles is light in weight, wide in field of vision and comfortable to wear on, and is also shapely in design, the number of the wearers to use such spectacles recently increases. As known, the rimless spectacles comprise a front frame formed by interconnecting a pair of right-and-left lenses through a bridge and a temple that is engaged to the respective ends of said front frame through an endpiece. However, a clamping hole is bored at a portion of the respective lenses, to which portion the bridge and the endpiece are engaged, and the respective lenses have to be clamped with a screw at such hole through a strap provided on the bridge and the endpiece.

However hard the respective lenses are clamped with a screw, the spectacles are subjected to incessant vibrations and external forces during use so that the engagement portion between the bridge or endpiece and the respective lenses becomes easy to fluctuate, which further brings the whole front frame into fluctuation. Then, as a countermeasure against such problem, such measure has been taken as fusing a splint plate having a shape corresponding to the side fringe of the respective lenses on a counterpart portion of the bridge and the endpiece respectively and abutting this splint plate onto the side fringe thereof so as to prevent the relative movement between the bridge or the endpiece and the respective lenses.

However, the provision of such splint plate on the bridge and the endpiece has no effect to stop the fluctuation of the screw clamping portions, and the splint plate comes to slide along the side fringe of the respective lenses centering on the clamping portion (or clamping hole) of the respective lenses because of the smoothness of the side fringe surface, which results in being unable to prevent the displacement of the clamping position of the respective lenses. It occurs in the case of prescription eyeglasses that the displacement of the clamping position of the respective lenses invites the misalignment between the pupil distance of a wearer and the optical axis of the right-and-left lenses so as to cause eyestrains to the wearer.

In view of the above inconveniences encountered with the prior art and in order to solve such prior issues as mentioned above, the present invention is to provide the rimless spectacles with lens holding stability whose right-and-left lenses are very stably jointed to its engagement parts so as to be held in proper position against minute vibrations or incessant external forces and whose stability in shape lasts for a long period of time.

The present invention is further to provide the rimless spectacles whose assembly parts are small in number and whose design is shapely, and also which can be more far efficiently assembled than the rimless spectacles with the conventional assembly.

The present invention is further to provide the rimless spectacles whose assembly parts are simple in shape so as to be advantageous for the parts inventory control and the maintenance thereof.

DISCLOSURE OF THE INVENTION

The means adopted in the invention to solve the above issues are described below with reference to the accompanying drawings.

That is to say, the rimless spectacles according to the present invention is characterized in comprising a bridge 2 that is a metallic member to form a front frame F by holding a pair of lenses 1 and 1 in juxtaposition, said bridge being provided with a stay bar 21 to keep the respective lenses at a certain interval and a splint plate 22 provided at the respective ends of said stay bar 21 to abut onto a fringe side of the respective lenses 1 and 1 and a pin 23 to poke through and support for connection the respective lenses 1 and 1 in a vicinity of the splint plate 22; an endpiece 3 that is a metallic member extensively engaged to an outer end portion of the respective lenses 1 and 1 of the front frame F, said endpiece being provided with a splint plate 31 to abut onto an outer side fringe of the respective lenses 1 and 1 and a pin 32 to poke through and support for connection the respective lenses 1 and 1 in a vicinity of the splint plate 31; a pressure exerting screw 4 that is screwed in the splint plate 31 of the respective endpieces 3 and the respective splint plates 22 of the bridge 2 to prevent fluctuation of said plates, said screw 4 being driven through the respective splint plates with said plates abutted onto the side fringe of the respective lenses 1 and 1 so as to set in said fringe side through an end portion 41 thereof and a temple 5 that is extended with regard to a backside of the front frame F through the respective endpieces 3 and 3.

As for the materials of the assembly parts of the rimless spectacles according to the present invention, an inorganic glass may be adopted for the lenses 1 and 1 to be used in this invention, but those conventionally well-known plastic lenses molded from such as methacrylic resin, polystyrene resin, styrene-acrylic resin, polyurethane resin and polycarbonate resin are also available, provided that light weight is of most concern. Some of the examples of the lenses 1 and 1 to be used for the rimless spectacles of the present invention include such prescription lenses as a concave lens for nearsightedness, a convex lens for farsightedness, a cylinder lens for astigmatism, a bi-focal lens and a progressive focal lens or such protection lens for the retinas as blocking UV and IR rays or such polarized lens as preventing dizziness. The respective lenses 1 and 1 to form the front frame F are provided with the respective clamping holes 11 and 11, into which the pins 23 and 32 are inserted, to the side of the bridge 2 and the endpiece 3.

Then, the examples of the materials for the bridge 2 and the endpiece 3 include such alloys as German silver, Monel, Stainless and Nickel-Chromium compounds that are used for a pair of spectacles, the lenses of which are enclosed with a metallic rim. Instead of such alloys, the rare metal such as 18 k. Gold is also adoptable. Provided that being light in weight is of most concern, preferably, aluminous alloy, β-titanium or magnesium alloy is adoptable while a super elastic alloy such as nickel-titanium alloy is adoptable for improving the comfortableness to wear the spectacles on. In the above cases, the pin 23 of the bridge 2 and that 32 of the endpiece 3 respectively may be integrally molded with themselves by means of lost wax process and so forth, but those pins maybe separately attached onto themselves by means of either welding process or brazing process. This also applies to the pad arms as described below, into which arm a nose pad is mounted.

Then, the temple 5 may be made from metallic material or synthetic resin. Where it is made from the latter, it should be hinged to the extensive portion 33 of the endpiece 3 so that it is required to be provided at its proximal end portion with a metallic hinge lobe 51. On the other hand, where it is made from metallic material, it does not necessarily require such hinge mechanical parts. However, it is required to provide a portion 52 that is easy to bend and good at flexibility with its proximal end portion, which portion may be arranged to thin, for instance. Where a metallic temple 5 is hinged onto the extensive portion 33 of the endpiece 3, it is understood that the hinge lobe 51 is integrally provided at the proximal end portion of the temple or fixed to the same end portion by welding process or brazing process.

In addition to the above means, the present invention provides further purpose-minded rimless spectacles together with the following concrete means.

(a) Provided that the pin 23 of the bridge 2 and that 32 of the endpiece 3 are made from metallic material so as to make those pins rigid, when the pressure exerting screw 4 is screwed in the splint plates 22 and 31 of the bridge 2 and the endpiece 3 respectively so as to pressurize the side fringes of the respective lenses 1 and 1, the respective lenses are firmly interposed between the pins 23 and 32 and the corresponding splint plates 22 and 31 respectively so as to be stably held in check without displacement or fluctuation.

(b) Provided that the pin 23 of the bridge 2 and that 32 of the endpiece 3 are made from super elastic alloy, it allows the force to clamp the respective lenses between the pin and the splint plate to be optimized and made flexible. The conventionally known welding or brazing process may be adopted for the jointing of the pin 23 to the bridge 2 and the pin 32 to the endpiece 3, which pins are made from super elastic alloy.

(c) Provided that the respective lenses 1 and 1 to form a front frame F are made from synthetic resin, the sharpening of the end portion 41 of the pressure exerting screw 4, which portion contacts the side fringes of the respective lenses 1 and 1, allows said end portion 41 to seize the side fringes thereof with a pointed end when the screws 4 are driven into the splint plates, so as to prevent those plates from fluctuating with regard to the fringe sides of the respective lenses.

(d) Provided that the respective lenses 1 and 1 to form a front frame F are made from glass, it is preferred to use a pressure exerting screw that is made from such super hard alloy as WC—TiC—Co based alloy or WC—TiC—TaC—Co based alloy that is hard enough to make a scratch on the surface of the lens.

(e) The rough or knurling finishing to be performed at least on a portion of the side fringes of the respective lenses 1 and 1, onto which portion the end portion 41 of the pressure exerting screw 4 abuts, allows the effect brought by the screw to prevent the lens from fluctuating to further improve.

(f) The temple 5 may be arranged such that it is collapsibly hinged to the hinge lobes 34 provided at the extensive portion 33 of the endpiece 3, but the endpiece 3 and the temple 5 may be integrally formed in one streak instead of such hinge arrangement. In the latter case, a portion 52 easy to bend is provided with the temple 5 in the vicinity of the front frame F, which portion 52 allows the temple to collpase.

(g) A pad arm 24 to be provided at the respective ends of the bridge 2 allows a nose pad P to be mounted into the end portion of the said pad arm 24.

BEST MODE FOR CARRYING OUT THE INVENTION

Hereinafter, the preferred embodiments of the present invention are in more details described below with reference to the accompanying drawings.

First Embodiment

Figure 1:
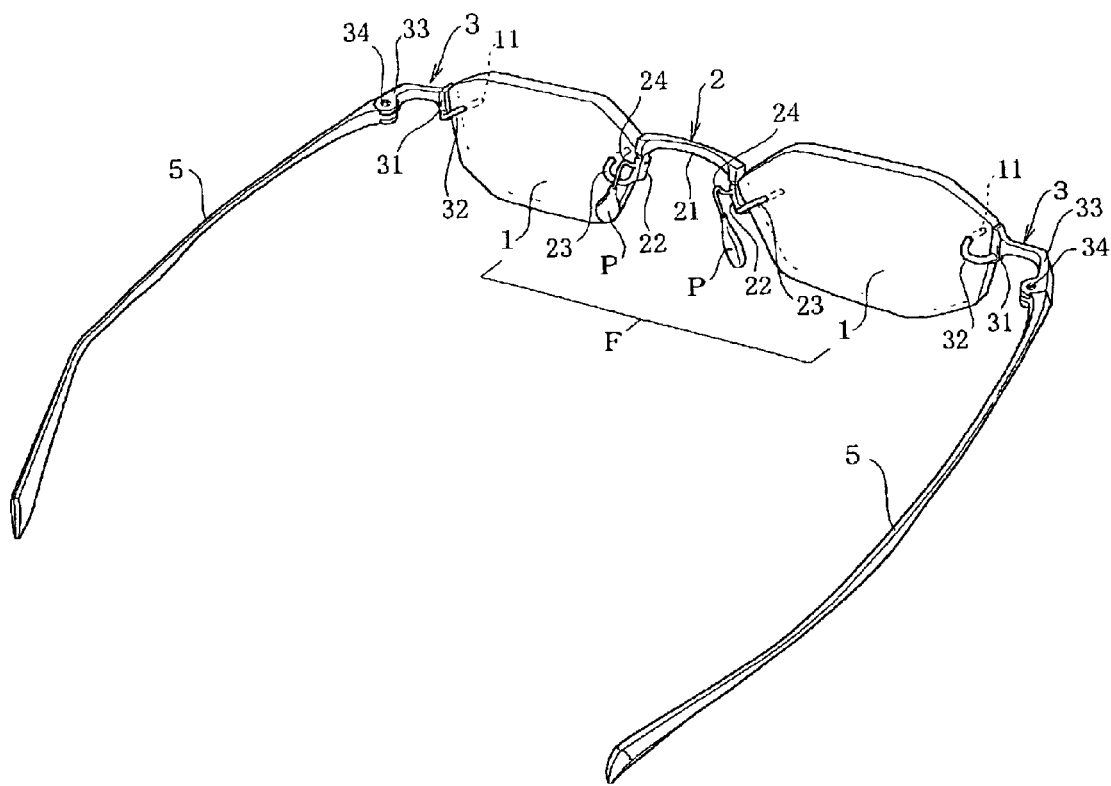
FIG. 1 is a perspective view to show the whole arrangement of the rimless spectacles of the first embodiment of the present invention.
Figure 2:
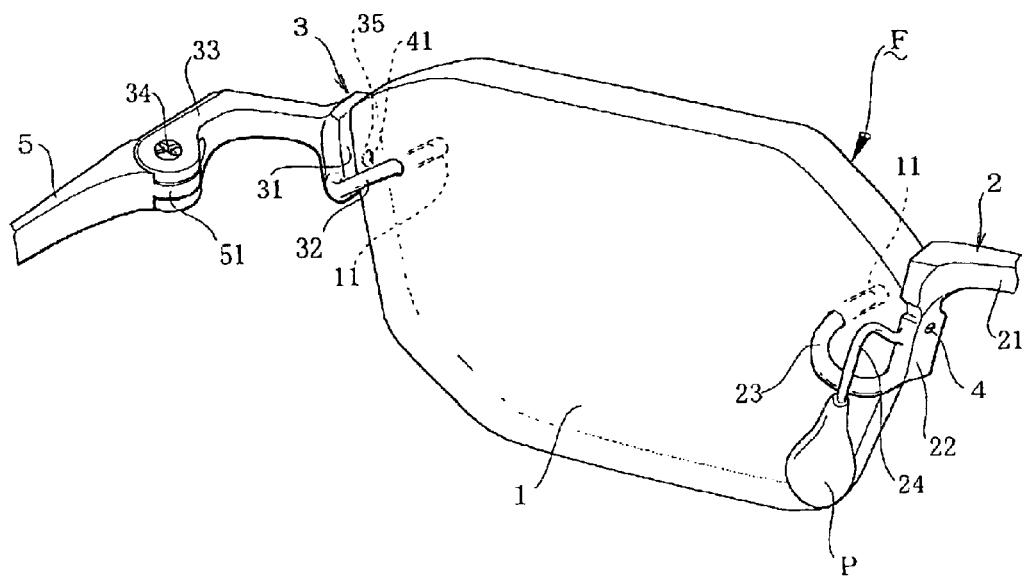
FIG. 2 is a partly enlarged perspective view to show the endpiece portion of the rimless spectacles of the first embodiment.
Figure 3:
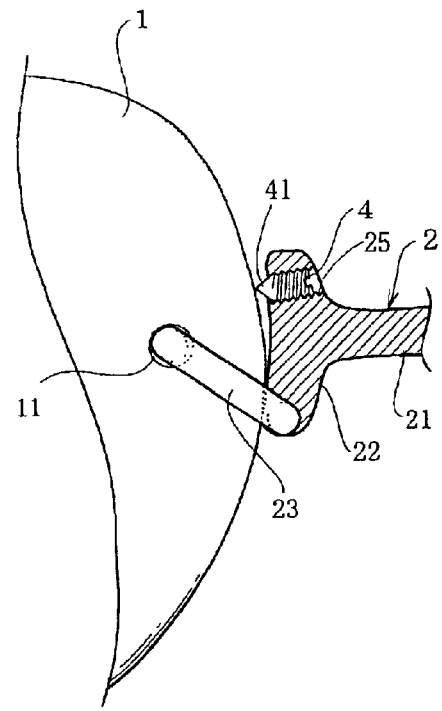
FIG. 3 is a partly broken enlarged view of the bridge portion of the rimless spectacles of the first embodiment to show the engagement among the lens, the pins, the splint plates and the pressure exerting screws thereat.

FIGS. 1 to 3 show the rimless spectacles of the present embodiment, in which reference numeral 1 indicates a lens molded from polycarbonate resin for nearsightedness, said lens being used in pair. A clamping hole 11 is opened in the vicinity of a side fringe of the respective lenses 1 and 1, to which side fringe a bridge and an endpiece as described below are engaged.

Then, reference numeral 2 in the drawings indicates a bridge made from β-titanium to hold a pair of said lenses 1 and 1 in juxtaposition so as to form a front frame F. This bridge is provided with a splint plate 22 at the respective ends or side surfaces of a stay bar 21 of a required length, which plate abuts onto the side fringe of the respective lenses, and a pin 23 to curve in U shape from the lower portion or rear surface side (the ocular side) of the splint plate 22 and to extend forwards. The respective pins 23 take the shape of a circular rod of 2 mm in diameter and have such rigidity as not being bent by the human hands, which pins are inserted from the rear side surface of the front frame F into the clamping holes 11 of the respective lenses 1 and 1 so as to abut the splint plates 22 and 22 onto the opposed inner side fringes of the respective lenses. Then, reference numeral 24 indicates a pad arm that is extensively provided slightly above the pin 23 and that takes the shape of a wire of 0.5 mm in diameter so as to be rendered flexible with springy elasticity, into the end portion of which arm a nose pad P is mounted. To note, a female screw hole 25 is bored in the side surface of the respective splint plates 22 and 22 towards the abutment side thereof to the respective lenses 1 and 1, into which hole a pressure exerting screw as described below is driven.

Then, reference numeral 3 in the drawings indicates an endpiece that is made from β-titanium like the above bridge 2. The endpiece of the present embodiment takes the shape of a bracket as bent in L shape, which endpiece is provided with a splint plate 31 to abut onto the outer fringe side of the respective lenses 1 and 1 to form the front frame F, a pin 32 to curve in U shape from the lower portion or rear surface side (the ocular side) of the splint plate 31 and to extend forwards and hinge lobes 34 provided at an extensive portion 33 thereof that bends in L shape and extends rearwards. This pin 32 also takes the shape of a circular rod of 2 mm in diameter and has such rigidity as not being bent by the human hands like that 23 of the bridge 2, which pin is inserted from the rear side of the front frame F into the clamping hole 11 of the respective lenses 1 and 1 so as to abut the splint plate 31 onto the outer fringe side of the respective lenses 1 and 1. A female screw hole 35 is bored in the side surface of the splint plate 31 towards the abutment side thereof to the respective lenses 1 and 1, into which hole a pressure exerting screw as described below is driven.

Then, reference numeral 4 in the drawings indicates a pressure exerting screw made from stainless, which screw is driven into the female screw hole 25 provided through the splint plate 22 and the female screw hole 35 provided through the splint plate 31. The end portion 41 of this screw is sharply pointed in this embodiment, which portion sets in the side surface of the respective lenses as if it seizes the same surface with a pointed claw upon its abutment onto the side surface of the lenses made from polycarbonate as mentioned above.

Reference numeral 5 in the drawings indicates a temple, the whole of which temple is made from β-titanium in this embodiment. A hinge lobe 51 is integrally provided at the proximal end portion of the temple 5 in this embodiment, which hinge lobe is mounted between the hinge lobes 34 provided at the extensive portion 33 of the endpiece 3 as a counterpart to the latter. The hinge lobes 34 and the hinge lobe 51 are engaged with a pivot screw such that they pivot relative to each other.

Second Embodiment

Figure 4:
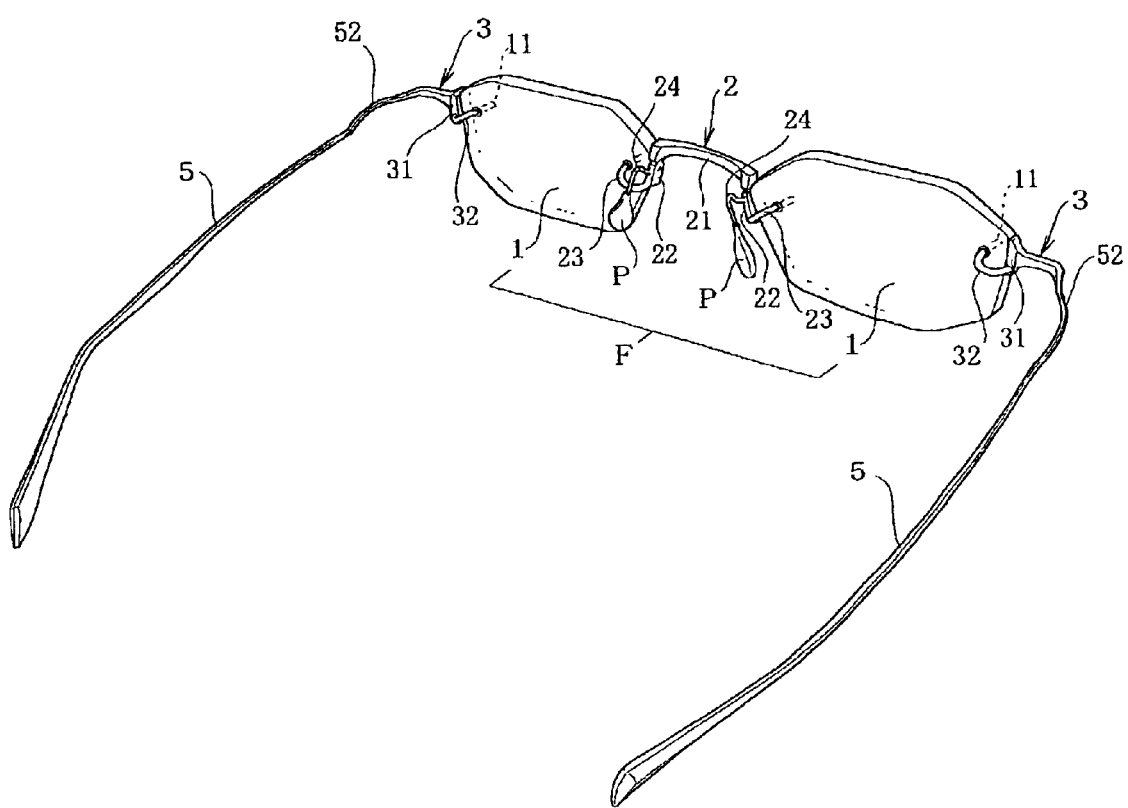
FIG. 4 is a perspective view to show the whole arrangement of the rimless spectacles of the second embodiment.
Figure 5:
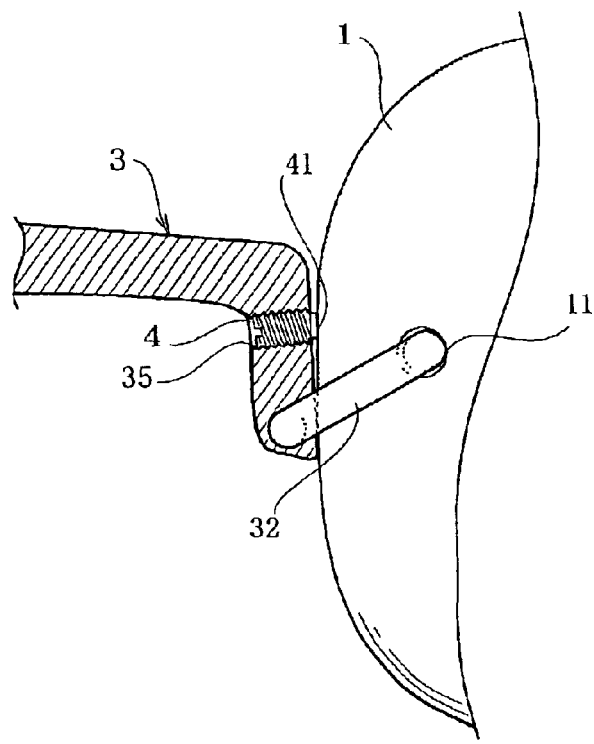
FIG. 5 is a partly broken enlarged view of the endpiece portion of the rimless spectacles of the first embodiment to show the engagement among the lens, the pin, the splint plate and the pressure exerting screw thereat.
Figure 6:
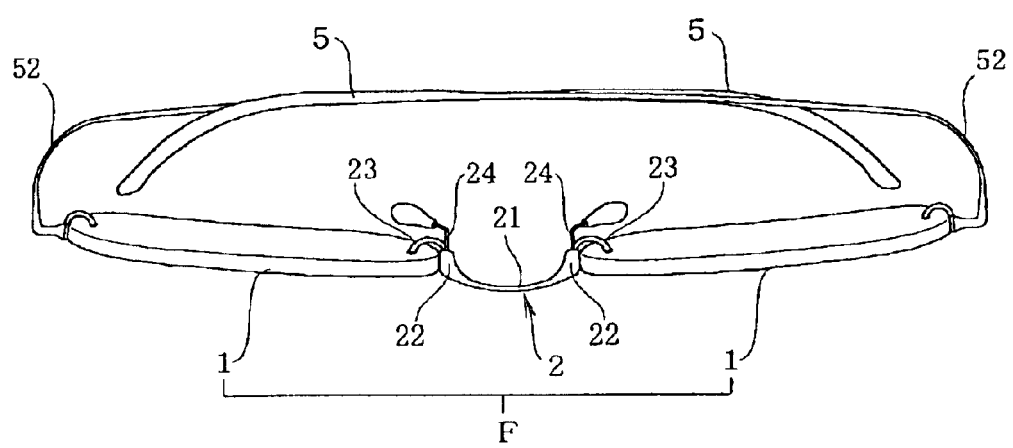
FIG. 6 is a plan view of the rimless spectacles of the second embodiment to show the temple collapsed along the rear side of the front frame.

The second embodiment of the present invention is shown in FIGS. 4 to 6. Reference numeral 1 in the drawings indicates a lens made from an inorganic glass that is light in weight and of high refractive index, said lens being used in pair. A clamping hole 11 is opened in the vicinity of the side fringe of the respective lenses 1 and 1, to which side fringe a bridge and endpiece as described below are engaged.

Reference numeral 2 in the drawings indicates a bridge made from German silver (Ni—Cu—Zn alloy), which bridge holds a pair of the above lenses 1 and 1 in juxtaposition so as to form a front frame F. This bridge 2 is, in the same way as the first embodiment, provided at the respective ends or side surfaces of a stay bar 21 of a required length with a splint plate 22, which plate abuts onto the fringe side of the above respective lenses, and with a pin 23 to curve in U shape from the lower portion or rear side surface (the ocular side) of the plate 22 and to extend forwards. This pin 23 takes the shape of a wire of 0.8 mm in diameter so as to be rendered flexible with springy elasticity, so that the same pin inserted into the clamping hole 11 plays the role to push the lens 1 onto the splint plate 22, in other words, said lens being elastically interposed between said pin and splint plate. Reference numeral 24 in the drawings indicates a pad arm provided slightly above the pin 23, which arm takes the shape of a wire of 0.8 mm in diameter so as to be rendered flexible with springy elasticity and into the end portion of which arm a nose pad P is mounted. To note, in the side surface of the splint plate 22, a female screw hole 25 is bored towards the abutment portion thereof to the lens 1, into which screw hole a pressure exerting screw as described below is driven. The shape of the bridge 2 of this embodiment is the same as that of the first embodiment, but its material and the diameter of the pin 23 and the pad arm 24 respectively differ from the latter.

Reference numeral 3 in the drawings indicates an endpiece that is made from German silver like the above bridge 2, which endpiece is integrally formed with a temple as described below so as to extend to the backward of the front frame F differently from the first embodiment. This endpiece, in the same as that of the first embodiment, is provided with a splint plate 31 to abut onto the outer side fringe of the respective lenses 1 and 1 to form the front frame F and a pin 32 to curve in U shape from the lower portion or rear surface (the ocular side) of the splint plate 31 and to extend forwards. The pin 32, in the same as that 23 of the bridge 2, takes the shape of a wire of 0.8 mm in diameter so as to be rendered flexible with springy elasticity, through which elasticity the lens 1 is interposed between the clamping hole 11 and the splint plate 31. To note, a female screw hole 35 is bored in the side surface of the splint plate 31 towards the abutment side thereof to the lens 1, into which hole a pressure exerting screw as described below is driven.

Then, reference numeral 4 in the drawings indicates a pressure exerting screw made from stainless, which screw is driven into the female screw hole 25 bored through the splint plate 22 and that 35 bored through the splint plate 31. The end portion 41 of this screw 4 is formed blunt in section in this embodiment, on the sectional surface of which portion rough finishing operation is performed, so that the said end portion sets in the fringe side of the respective lenses 1 and 1 that are made from glass of light weight and high refractive index as mentioned above upon the abutment to the fringe side thereof, as if it puts on the brakes. To note, rough finishing (not shown in the drawings) operation is performed on a portion of the fringe side of the respective lenses 1 and 1, which portion contacts the end portion 41 of said pressure exerting screw 4.

Then, reference numeral 5 in the drawings indicates a temple integrally formed with the endpiece 3. A flexible portion 52 that is arranged to be thin and slightly narrow in width so as to bend outwards is provided at the proximal end portion of the temple 5 or in the vicinity of the front frame F in this embodiment. Force being applied to bend the temple 5 towards the front frame F by holding the free end portion thereof, the respective temples flexibly bend at the said portion 52, which temples result in folding in a compact manner as shown in FIG. 6.

The preferred embodiments of the present invention are described in the above description, to which embodiments the present invention is not limited, but can be modified into the following manners within the scope of the accompanying claims, which modifications also belong to the technical scope of the present invention.

(a) In either case of the first and second embodiments, it is arranged such that the pins 23 and 32 are inserted from the rear side of the front frame F through the lens 1 so as to support for connection the latter, but it is needless to say that they may be inserted through the lens from the frontal side of the front frame F.

(b) Provided that the pressure exerting screw 4 is made from super hard alloy, when it abuts onto the fringe side of the respective lenses 1 and 1 made from an inorganic hard glass, it enhances the checking capability of the screw to the fringe side thereof so as to improve lens holding stability.

(c) Provided that rough finishing or knurling (not shown in the drawings) operation is performed on at least the portion of the respective lenses 1 and 1 onto which the end portion 41 of the screw 4 abuts, the lens checking capability of the screw further enhances.

Industrial Applicability

As described above, the rimless spectacles embodied in the present invention adopts a bridge and an endpiece provided with the splint plate and the pin as mentioned above, and is arranged such that the respective pins are inserted through the respective lenses with the splint plates abutted onto the fringe sides of the respective lenses and the end portions of the pressure exerting screws that are driven into the splint plates are protruded pressingly against the fringe sides thereof so as to firmly set in the respective lenses to form the front frame F. Thus, the jointing condition between the respective lenses and the assembly parts to be engaged thereto of the rimless spectacles arranged according to the present invention is very stable, so that the respective lenses are held in a proper position without being fluctuated even if they are subjected to fine vibrations or continuous external force, with the result that the shape stability of the spectacles continues for a long period of time.

Further, the rimless spectacles embodied in the present invention can be assembled with a pair of lenses, the bridge and endpiece of simple structure as well as a few of the pressure exerting screws so as to streamline the number of the assembly parts and to make the spectacles shapely in design. Correspondingly, the assembly work thereof becomes simplified so that it can be manufactured more far efficiently than the rimless spectacles of the conventional structural arrangement, which leads to the reduction of the production cost.

Further, the assembly parts of the rimless spectacles according to the present invention are simple in shape and the number thereof is small, which is advantageous for the inventory control and maintenance thereof.

The present invention not only resolves all the technical issues of the conventional rimless spectacles, but also reduces the production cost, which is advantageous for both practical and economical points of view. In view of the foregoing, the industrial applicability of the present invention is very high.

What is claimed is:

1. Rimless spectacle with lens holding stability comprising a metallic bridge (2) that holds a pair of lenses (1) and (1) in juxtaposition so as to provide a front frame F, said bridge (2) being provided with a stay bar (21) to keep the respective lenses (1) and (1) at a given interval and a splint plate (22) that is provided at respective ends of said stay bar (21) and abuts onto a fringe side of the respective lenses (1) and (1) and a pin (23) to poke through and support for connection the respective lenses (1) and (1) in a vicinity of said splint plate (22); a metallic endpiece (3) extensively engaged to an outer end portion of the respective lenses (1) and (1) of said front frame F, said endpiece being provided with a splint plate (31) to abut onto an outer fringe side of the respective lenses (1) and (1) and a pin (32) to poke through and support for connection the respective lenses (1) and (1) of the front frame F in a vicinity of the splint plate (31); a pressure exerting screw (4) that is screwed in the splint plate (31) of the respective endpieces (3) and the respective splint plates (22) and (22) of the bridge (2) to prevent a relative movement between said plates and fringe sides, said screw being driven through the respective splint plates in abutment to the fringe side of the respective lenses (1) and (1) so as to set in said fringe sides through an end portion (41) thereof; and a temple (5) to extend backwards from the front frame F through the respective endpieces (3) and (3).

2. Rimless spectacles according to claim 1, wherein the pin (23) of the bridge (2) and the pin (32) of the endpiece (3) respectively are possessed of rigidity, wherein the respective lenses (1) and (1) are held in check without fluctuation between the pin (23) and the splint plate (22) as well as the pin (32) and the splint plate (31) by pressingly protruding the pressure exerting screw (4) that is driven through the splint plates (22) and (31) respectively against the fringe side of the respective lenses.

3. Rimless spectacles according to claim 2, wherein the pin (23) of the bridge (2) and the pin (32) of the endpiece (3) poke through from the backside of the respective lenses (1) and (1) to provide the front frame F and support for connection said lenses.

4. Rimless spectacles according to claim 2, wherein the pin (23) of the bridge (2) and the pin (32) of the endpiece (3) poke through from the frontal side of the respective lenses (1) and (1) to provide the front frame F and support for connection said lenses.

5. Rimless spectacles according to claim 2, wherein the respective lenses (1) and (1) to provide the front frame F are made from synthetic resin and the end portion (41) of the pressure exerting screw (4) to contact the fringe side of said respective lenses is pointed.

6. Rimless spectacles according to claim 2, wherein the respective lenses (1) and (1) to provide the front frame F are made from glass and the pressure exerting screw (4) to contact the fringe side of said respective lenses is made from super hard alloy, wherein the end portion (41) of said screw (4) cuts into the fringe side of said respective lenses so as to set in said fringe side.

7. Rimless spectacles according to claim 2, wherein a rough finishing or knurling operation is performed on at least a portion of the fringe side of the respective lenses (1) and (1) to provide the front frame F, onto which portion the end portion (41) of the pressure exerting screw (4) abuts.

8. Rimless spectacles according to claim 2, wherein the temple (5) is hinged to hinge lobes (34) provided on an extensive portion (33) of the endpiece (3) such that it is collapsible.

9. Rimless spectacles according to claim 2, wherein the endpiece (3) and the temple (5) are integrally formed without hinge connection, wherein the flexible portion (52) is provided with the temple (5) in the vicinity of the front frame F such that said temple is collapsible at said portion (52).

10. Rimless spectacles according to claim 2, wherein the bridge (2) is provided at its respective sides with the pad arm (24), into an end portion of which arm the pad P is mounted.

11. Rimless spectacles according to claim 1, wherein the pin (23) of the bridge (2) and the pin (32) of the endpiece (3) are made from super elastic alloy.

12. Rimless spectacles according to claim 11, wherein the pin (23) of the bridge (2) and the pin (32) of the endpiece (3) poke through from the backside of the respective lenses (1) and (1) to provide the front frame F and support for connection said lenses.

13. Rimless spectacles according to claim 11, wherein the pin (23) of the bridge (2) and the pin (32) of the endpiece (3) poke through from the frontal side of the respective lenses (1) and (1) to provide the front frame F and support for connection said lenses.

14. Rimless spectacles according to claim 11, wherein the respective lenses (1) and (1) to provide the front frame F are made from synthetic resin and the end portion (41) of the pressure exerting screw (4) to contact the fringe side of said respective lenses is pointed.

15. Rimless spectacles according to claim 11, wherein the respective lenses (1) and (1) to provide the front frame F are made from glass and the pressure exerting screw (4) to contact the fringe side of said respective lenses is made from super hard alloy, wherein the end portion (41) of said screw (4) cuts into the fringe side of said respective lenses so as to set in said fringe side.

16. Rimless spectacles according to claim 11, wherein a rough finishing or knurling operation is performed on at least a portion of the fringe side of the respective lenses (1) and (1) to provide the front frame F, onto which portion the end portion (41) of the pressure exerting screw (4) abuts.

17. Rimless spectacles according to claim 11, wherein the temple (5) is hinged to hinge lobes (34) provided on an extensive portion (33) of the endpiece (3) such that it is collapsible.

18. Rimless spectacles according to claim 11, wherein the endpiece (3) and the temple (5) are integrally formed without hinge connection, wherein the flexible portion (52) is provided with the temple (5) in the vicinity of the front frame F such that said temple is collapsible at said portion (52).

19. Rimless spectacles according to claim 11, wherein the bridge (2) is provided at its respective sides with the pad arm (24), into an end portion of which arm the pad P is mounted.

20. Rimless spectacles according to claim 1, wherein the pin (23) of the bridge (2) and the pin (32) of the endpiece (3) poke through from a backside of the respective lenses (1) and (1) to provide the front frame F and support for connection said lenses.

21. Rimless spectacles according to claim 20, wherein the respective lenses (1) and (1) to provide the front frame F are made from synthetic resin and the end portion (41) of the pressure exerting screw (4) to contact the fringe side of said respective lenses is pointed.

22. Rimless spectacles according to claim 20, wherein the respective lenses (1) and (1) to provide the front frame F are made from glass and the pressure exerting screw (4) to contact the fringe side of said respective lenses is made from super hard alloy, wherein the end portion (41) of said screw (4) cuts into the fringe side of said respective lenses so as to set in said fringe side.

23. Rimless spectacles according to claim 20, wherein a rough finishing or knurling operation is performed on at least a portion of the fringe side of the respective lenses (1) and (1) to provide the front frame F, onto which portion the end portion (41) of the pressure exerting screw (4) abuts.

24. Rimless spectacles according to claim 20, wherein the temple (5) is hinged to hinge lobes (34) provided on an extensive portion (33) of the endpiece (3) such that it is collapsible.

25. Rimless spectacles according to claim 20, wherein the endpiece (3) and the temple (5) are integrally formed without hinge connection, wherein the flexible portion (52) is provided with the temple (5) in the vicinity of the front frame F such that said temple is collapsible at said portion (52).

26. Rimless spectacles according to claim 20, wherein the bridge (2) is provided at its respective sides with the pad arm (24), into an end portion of which arm the pad P is mounted.

27. Rimless spectacles according to claim 1, wherein the pin (23) of the bridge (2) and the pin (32) of the endpiece (3) poke through from a frontal side of the respective lenses (1) and (1) to provide the front frame F and support for connection said lenses.

28. Rimless spectacles according to claim 27, wherein the respective lenses (1) and (1) to provide the front frame F are made from synthetic resin and the end portion (41) of the pressure exerting screw (4) to contact the fringe side of said respective lenses is pointed.

29. Rimless spectacles according to claim 27, wherein the respective lenses (1) and (1) to provide the front frame F are made from glass and the pressure exerting screw (4) to contact the fringe side of said respective lenses is made from super hard alloy, wherein the end portion (41) of said screw (4) cuts into the fringe side of said respective lenses so as to set in said fringe side.

30. Rimless spectacles according to claim 27, wherein a rough finishing or knurling operation is performed on at least a portion of the fringe side of the respective lenses (1) and (1) to provide the front frame F, onto which portion the end portion (41) of the pressure exerting screw (4) abuts.

31. Rimless spectacles according to claim 27, wherein the temple (5) is hinged to hinge lobes (34) provided on an extensive portion (33) of the endpiece (3) such that it is collapsible.

32. Rimless spectacles according to claim 27, wherein the endpiece (3) and the temple (5) are integrally formed without hinge connection, wherein the flexible portion (52) is provided with the temple (5) in the vicinity of the front frame F such that said temple is collapsible at said portion (52).

33. Rimless spectacles according to claim 27, wherein the bridge (2) is provided at its respective sides with the pad arm (24), into an end portion of which arm the pad P is mounted.

34. Rimless spectacles according to claim 1, wherein the respective lenses (1) and (1) to provide the front frame F are made from synthetic resin and the end portion (41) of the pressure exerting screw (4) to contact the fringe side of said respective lenses is pointed.

35. Rimless spectacles according to claim 34, wherein a rough finishing or knurling operation is performed on at least a portion of the fringe side of the respective lenses (1) and (1) to provide the front frame F, onto which portion the end portion (41) of the pressure exerting screw (4) abuts.

36. Rimless spectacles according to claim 34, wherein the temple (5) is hinged to hinge lobes (34) provided on an extensive portion (33) of the endpiece (3) such that it is collapsible.

37. Rimless spectacles according to claim 34, wherein the endpiece (3) and the temple (5) are integrally formed without hinge connection, wherein the flexible portion (52) is provided with the temple (5) in the vicinity of the front frame F such that said temple is collapsible at said portion (52).

38. Rimless spectacles according to claim 34, wherein the bridge (2) is provided at its respective sides with the pad arm (24), into an end portion of which arm the pad P is mounted.

39. Rimless spectacles according to claim 1, wherein the respective lenses (1) and (1) to provide the front frame F are made from glass and the pressure exerting screw (4) to contact the fringe side of said respective lenses is made from super hard alloy, wherein the end portion (41) of said screw (4) cuts into the fringe side of said respective lenses so as to set in said fringe side.

40. Rimless spectacles according to claim 39, wherein a rough finishing or knurling operation is performed on at least a portion of the fringe side of the respective lenses (1) and (1) to provide the front frame F, onto which portion the end portion (41) of the pressure exerting screw (4) abuts.

41. Rimless spectacles according to claim 39, wherein the temple (5) is hinged to hinge lobes (34) provided on an extensive portion (33) of the endpiece (3) such that it is collapsible.

42. Rimless spectacles according to claim 39, wherein the endpiece (3) and the temple (5) are integrally formed without hinge connection, wherein the flexible portion (52) is provided with the temple (5) in the vicinity of the front frame F such that said temple is collapsible at said portion (52).

43. Rimless spectacles according to claim 39, wherein the bridge (2) is provided at its respective sides with the pad arm (24), into an end portion of which arm the pad P is mounted.

44. Rimless spectacles according to claim 1, wherein a rough finishing or knurling operation is performed on at least a portion of the fringe side of the respective lenses (1) and (1) to provide the front frame F, onto which portion the end portion (41) of the pressure exerting screw (4) abuts.

45. Rimless spectacles according to claim 44, wherein the temple (5) is hinged to hinge lobes (34) provided on an extensive portion (33) of the endpiece (3) such that it is collapsible.

46. Rimless spectacles according to claim 44, wherein the endpiece (3) and the temple (5) are integrally formed without hinge connection, wherein the flexible portion (52) is provided with the temple (5) in the vicinity of the front frame F such that said temple is collapsible at said portion (52).

47. Rimless spectacles according to claim 44, wherein the bridge (2) is provided at its respective sides with the pad arm (24), into an end portion of which arm the pad P is mounted.

48. Rimless spectacles according to claim 1, wherein the temple (5) is hinged to hinge lobes (34) provided on an extensive portion (33) of the endpiece (3) such that it is collapsible.

49. Rimless spectacles according to claim 48, wherein the bridge (2) is provided at its respective sides with the pad arm (24), into an end portion of which arm the pad P is mounted.

50. Rimless spectacles according to claim 1, wherein the endpiece (3) and the temple (5) are integrally formed without hinge connection, wherein a flexible portion (52) is provided with the temple (5) in a vicinity of the front frame F such that said temple is collapsible at said portion (52).

51. Rimless spectacles according to claim 50, wherein the bridge (2) is provided at its respective sides with the pad arm (24), into an end portion of which arm the pad P is mounted.

52. Rimless spectacles according to claim 1, wherein the bridge 2 is provided at its respective sides with a pad arm (24), into an end portion of which arm a pad P is mounted.

* * * * *